United States Patent [19]  [11]  4,401,610
Öhberg  [45]  Aug. 30, 1983

[54] METHOD FOR MANUFACTURE OF SHAPED OBJECTS OF MINERAL WOOL

[75] Inventor: Ingemar Öhberg, Skövde, Sweden

[73] Assignee: Rockwool Aktiebolaget, Skövde, Sweden

[21] Appl. No.: 191,444

[22] Filed: Sep. 29, 1980

Related U.S. Application Data

[63] Continuation of Ser. No. 958,687, Nov. 7, 1978, abandoned.

[30] Foreign Application Priority Data

Nov. 9, 1977 [SE] Sweden .............................. 7712654

[51] Int. Cl.$^3$ .............................................. B01J 2/22
[52] U.S. Cl. .................................. 264/40.4; 264/40.5; 264/118; 264/120; 264/121; 264/122; 264/146
[58] Field of Search ............... 264/122, 120, 121, 118, 264/40.4, 40.5, 146

[56] References Cited

U.S. PATENT DOCUMENTS

| | | | |
|---|---|---|---|
| 2,517,707 | 8/1950 | Payne | 264/143 |
| 3,920,783 | 6/1966 | Hara et al. | 264/143 |
| 3,950,118 | 4/1976 | Adair | 264/40.6 |
| 4,081,501 | 3/1978 | Muther | 264/121 |
| 4,083,913 | 4/1978 | Marshall | 264/121 |
| 4,155,968 | 5/1979 | Yamamoto et al. | 264/40.6 |

Primary Examiner—James R. Hall
Attorney, Agent, or Firm—Larson & Taylor

[57] ABSTRACT

A method and an apparatus for manufacture of moulded mineral wool objects which are bound by a binder and which have a substantially constant cross-section along their entire lengths, whereby mineral wool in the form of flocks and/or granules which are impregnated or mixed with a binder and which are collected in a feeding chamber to which a mould channel is connected. The mineral wool is continuously or stepwise pressed by a compressing device into and through the mould channel and during the movement therein it is subjected to a heat treatment to cure the binder of the mineral wool, whereupon the continuous body of bound mineral wool is expelled from the channel. If desired it is subjected to a surface treatment or any subsequent treatment and is cut into intended lengths. The channel may include one or more cores providing one or more axial bores through the mineral wool body. A suction fan may be provided adjacent the inlet end of the channel, the suction side of which is connected to the interior of the channel to suck flocks and/or granules of mineral wool into the channel, whereas the pressure side thereof is connected to the feeding chamber to keep the flocks and/or granules of mineral wool fluidized.

14 Claims, 7 Drawing Figures

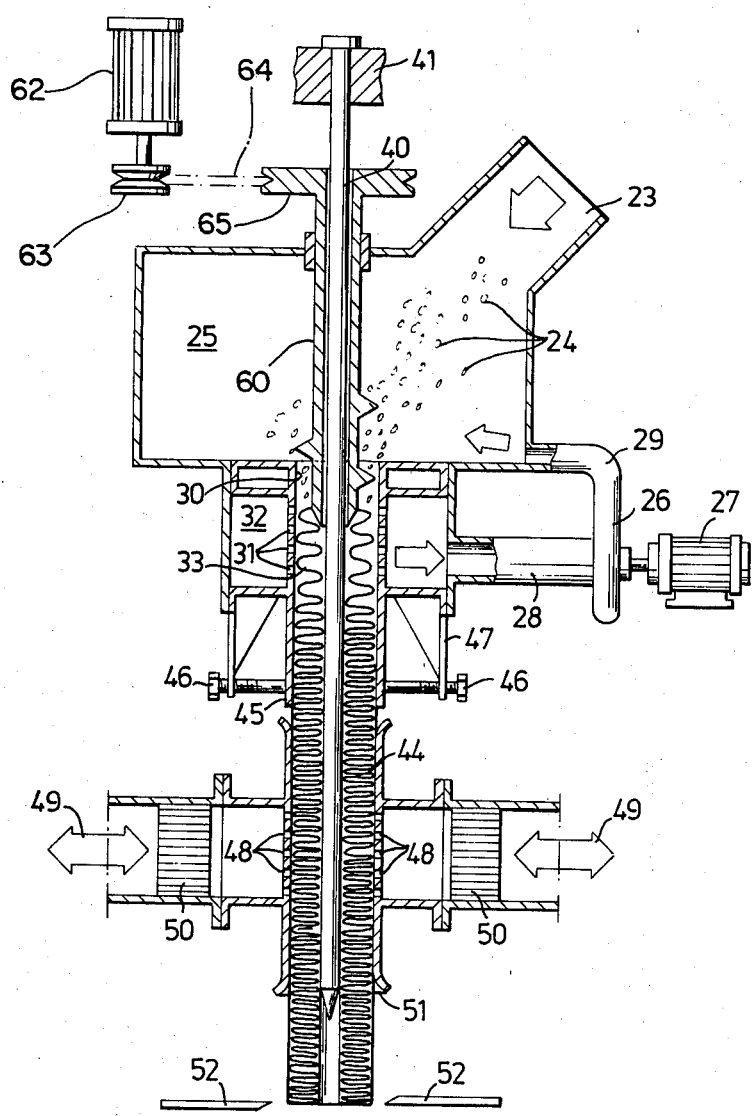

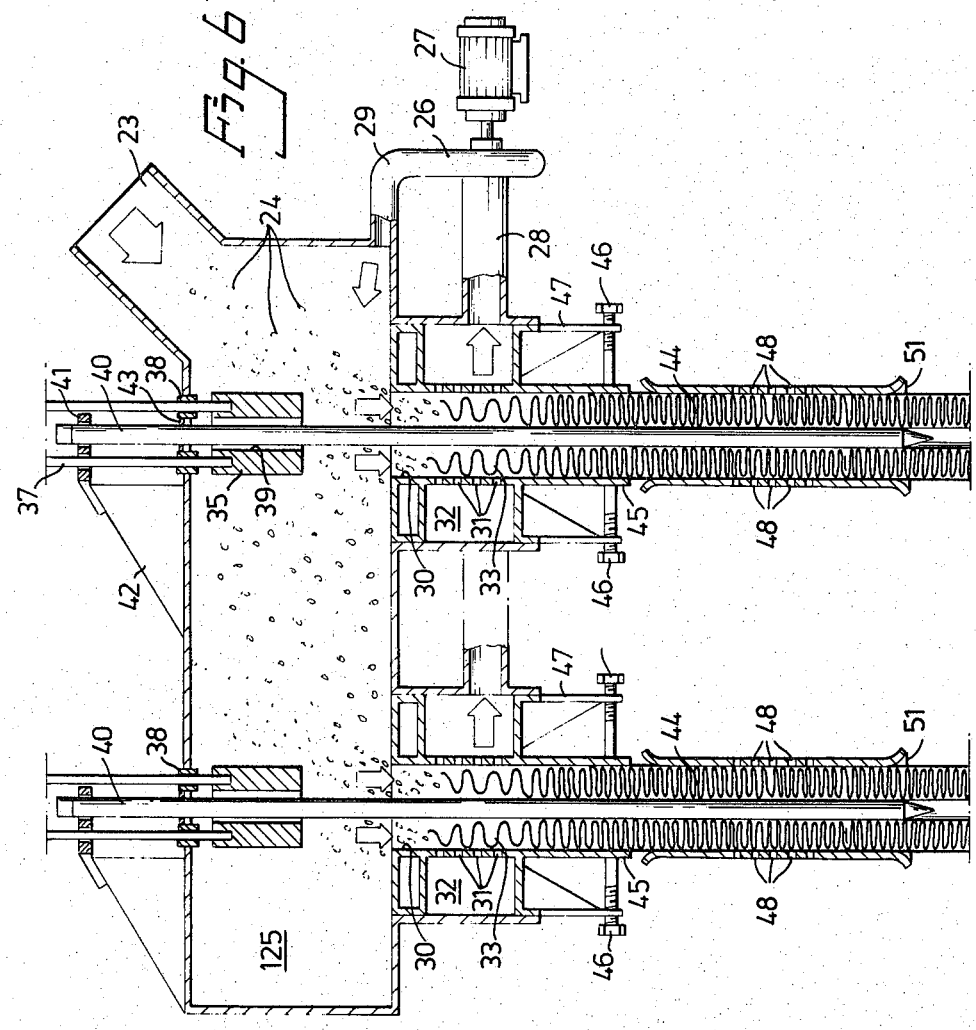

METHOD FOR MANUFACTURE OF SHAPED OBJECTS OF MINERAL WOOL

This is a continuation, of application Ser. No. 958,687 filed Nov. 7, 1978 now abandoned.

The present invention relates to a method of manufacture of shaped objects of mineral wool, each of which is fixed by a binder and which has a cross-section which is constant along substantially the entire length thereof, in that pieces of mineral wool are manufactured and impregnated or mixed with a binder and given an intended form, whereupon the binder is made stiff.

Mineral wool is mainly manufactured as useful for insulating purposes. Almost any type of mineral wool is impregnated by a binder and is shaped to lengths of more or less complex cross-sections, whereupon the binder is made stiff by a heat treatment. Mostly thermosetting resins are used as binders, especially phenolic plastics. Apart form such basically plane objects as plates, discs, felt and mats, so called pipe jackets, i.e. hollow cylinders used for isolating of pipes are manufactured to a relatively large extent. Finally a small but increasing number of other shaped objects such as isolating valve jackets, ceilings for motor cars and any other special objects are also produced. Said objects are manufactured by being form moulded generally by providing mineral wool impregnated with a binder in moulds, which mineral wool is thereafter pressed together while being heated, so that the mineral wool, by means of the binder, is fixed in the intended shape.

The main part of all pipe jackets are so manufactured that a thin layer of mineral wool which is impregnated by a binder is wound on a core or a mandrel. The mineral wool which is wound on the core is thereafter subjected to heat with or without having an outer mould. The heat may be supplied by introducing the mineral wool into a heat chamber and slowly heating it until the binder becomes stiff. Or a hollow, perforated core may be used, from which hot gases are pressed out through the mineral wool wound on the core, so that the mineral wool is thereby heated and the binder becomes stiff and the mineral wool layer retains the shape which it has been given.

Aside from the main method, there are basically three further methods. The first and most elementary way is to cut pipe jackets out of plates or discs. This can mainly be made in two different ways, either by punching or cutting out annular portions which are piled to form a pipe jacket, or by directly cutting the pipe jacket out of a plate of mineral wool by means of band saws which by sawing form the inner and outer surfaces of the pipe jacket. The band saws may work in parallel with the axis of the pipe jacket, but it is also possible to use circular band saw blades which act perpendicularly to the axis. The second method is an actual press moulding. In a metal mould having the pipe jacket form mineral wool is introduced, whereupon the mould is closed and is heated together with the mineral wool. Later a pipe jacket can be taken from the mould, generally, however, only in the form of a semi-cylindrical pipe jacket.

Recently another method has been introduced, in which a pipe jacket is manufactured continuously. Mineral wool in the form of a stream which is impregnated by a binder is fed into a pipe which is formed by two or several transport conveyors which are formed into a cylinder. In the centre of the said cylinder there is a fixed core, and the mineral wool stream is fed into the area between the cylinder and the core. After a heat treatment a pipe jacket is received at the opposite end.

For completeness it should also be mentioned that pipe jackets have been manufactured in which a mineral wool layer is screw formed wound onto a core and is thereafter hardened. This method also provides an endless pipe jacket as a final product.

The present invention also relates to the continuous manufacture of shaped objects of mineral wool, for instance pipe jackets. Differing from most previously known methods the invention is particularly suited for small pipe jackets, i.e. pipe jackets intended for pipes having small diameters. There is today a large demand for pipe jackets for insulating pipes having diameters down to 10 mm. If previously insulated at all such pipes or tubes have been insulated by winding a mineral wool mat around the pipe. Differing from the above related methods for manufacture of pipe jackets the present invention, however, has a substantially wider field of use, viz. in that the invention can be utilized for manufacture of shaped objects of mineral wool having a substantially constant cross-section form. Apart from the products, the cross-section form of which is completely constant along its entire length, it is also possible according to the invention to manufacture products by means of simple supplementary operations in which there are minor differences in cross-section form such as bevelled edges, cavities etc. along the length of the product.

The main object of the invention is to provide a method for manufacture of shaped objects, in which the method has some features in common with extrusion of injection moulding. Thus the method relates to manufacture of shaped objects which over the length thereof has a substantially constant cross-section. The starting material is mineral wool which is mixed with a binder and which in the conventional manner is manufactured by providing fibres from melted mineral, whereafter the fibres are mixed with a binder, preferably of the thermosetting type. The binder can be added by spraying a solution of binder onto the fibres just provided or by mixing a dry binder powder with the mineral wool. As in any other manufacture of for instance pipe jackets the mineral wool is shaped to the intended form, whereupon the binder is caused to stiffen. If a thermosetting resin is used, which is the normal and most suitable, the fixing of the binder is done by a heat treatment operation. After the product is shaped it may, if necessary, be subjected to different types of subsequent treatments. As examples of such subsequent treatments there can be mentioned mechanical operations such as slitting the product up, bevelling the ends, cutting the product, covering the product by a surface layer, etc.

In the method according to the invention the shaping and the fixing of the binder takes place in a channel, at one end of which there exists flocks and/or granules of mineral wool in which the binder has not yet been fixed, whereupon the flocks and/or granules are pressed together and are fed further into the mould channel by a compressing means while the binder in the compressed length of mineral wool in the channel is caused to get stiff or fixed. The apparatus for carrying out the invention comprises means for making flocks and/or granules, referred to hereinafter generally as pieces, of mineral wool impregnated with a binder, which means is connected to a conveyor for transmitting the said pieces to a feeding chamber to which one or several mould channels are connected for forming objects of mineral wool, whereby the mould channel or each channel comprises a compressing means for compressing and feeding pieces of mineral wool into and through the channel or channels. To the channel or channels is further connected an apparatus for directly or indirectly heating the length of the lengths of mineral wool fed within the channel or channels, thereby making the binder of the mineral wool stiff or fixed to provide a form stable mineral wool product.

It has previously been known to make flocks of mineral wool. Such flocks, however, have been made in connection with the manufacture of boards, and the purpose of making flocks has been to finely distribute the mineral wool so that the mineral wool can be recollected in a stream which is more homogenous that the original mineral wool stream which was fed into the flock making apparatus. When making flocks, the binder is also more evenly distributed in the mineral wool, and it is also a great advantage to add new or additional binder during the flock making. When making flocks the original mineral wool stream is split up at the places where there is only little binder. Such portions which have relatively little amount of binder thereby form the outer layer of the flocks. By adding further binder to the mineral wool the said binder is received on the areas where there was originally a low content of binder.

A problem which often occurs when working with flocks of mineral wool concerns the fact that the flocks do not appear as a free running mass. On the contrary the flocks have a tendency to stick together at the first possible opportunity and to thereby beome a more or less integral mass. It may thereby be difficult to bring the flocks into the channel in which they are to be compressed by the compressing means to an integral, compressed length of mineral wool. In such a case it may be possible to granulate the flocks, for instance by introducing the flocks at one end of a rotating drum. When leaving the drum at the opposite end the flocks are thereby more modulated and have better free running properties.

Another possibility is to suck the flocks into the mould channel by means of an air flow. Different types of feeders may also be used, whereby especially reciprocating pistons have proved to be useful. also screws can be used for feeding the flocks into the mould channel. If screws are used they are of course not allowed to enter the working area of the compressing means, but if alternatively a feeder of the reciprocating piston type is used the feeder may advantageously enter a free working area of the compressing means in its extended position so that the flocks fed by the feeder are taken care of by the compressing means after the feeder is withdrawn and the flocks are pressed into the mould channel. This, however, is not absolutely necessary, but on the other hand the feeders should work at an angle to the operative direction of the compression means. The front end position of the feeders are also located outside of the working area of the compressing means. If means are provided for sucking the flocks into the mould channel by an air flow, it is advantageous to provide a circulating air flow. The air flow is withdrawn through openings in the mould channel walls and is delivered by a fan back into the mass of flocked mineral wool in the feeding chamber. From there the same air supporting new flocks is sucked into the channel.

The air which is returned by the suction fan to the flocked mineral wool helps to keep the flocks moving, thereby preventing the flocks from packing together. The holes in the channel walls should not be too wide, so that the air which is withdrawn through said holes will be substantially free from flocks of mineral wool.

When manufacturing unsymmetrical moulded objects, i.e. objects in which different parts of the cross-section include different large amounts of mineral wool, it has proved possible to vary the distribution of the amount of mineral wool of the channel by distributing the total area of the air withdrawal holes of the channel walls differently. At those places where a large amount of mineral wool is wanted more holes or possibly larger holes are provided than at other places.

Preferably a piston or a conical screw is used as the compressing means. If a piston is used it is of course necessary that the force by which the piston presses the mineral wool into the channel is sufficient for pressing the entire body of mineral wool further into the channel. Thereby the degree of compression that the mineral wool obtains depends on the friction between the channel and the body of mineral wool when moving the said body in the channel. If only a slight degree of compression is wanted the channel walls should be parallel or slightly diverging substantially along the entire length of the channel. For the products manufactured according to the invention it is, however, not necessary to provide the channel diverging at all. On the contrary it has proved suitable to provide a converging portion at some place between the end position of the piston in the channel and the location of the means for hardening the binder, and preferably the convergency of the said converging portion is made adjustable. If the convergency is made large, a strong resistance is provided against the feeding of the mineral wool pieces into the channel, which gives a high degree of compression and imparts a high density to the product. The conditions are the opposite if the convergency is only slight. Since it is always desirable to restrict the variations of density, it is now possible within the scope of the invention to control the density by controlling the convergency of the said converging portion of the channel. This can also be done automatically either by directly reading the density, for instance by automatically checking the weight of the moulded objects cut from the expelled length of mineral wool or indirectly by more or less continuously determining some property of the material which is closely correlated to the density. One important such property is the resistance against deformation offered by the formed product. The resistance can be determined by moving a pressurized roll or tongue roll over the surface of the moulded object while pressing the mineral wool length forward in the channel or after the length has left the mouth of the channel, whereupon the impression obtained from the roll or the tongue respectively is measured and registered. An impression which is greater than the intended one is an indication to increase the convergency of the channel which leads to an increased density and thereby a reduced impression. Another way to control the density of the product is to measure the damping factor of an ultra sound ray which is directed to or passes through a length of mineral wool. Correspondingly-radiation can be used. A further possibility is to measure the permeability which is highly correlated to the density. In all cases one should consider the displacement of time on the one hand between the time of measuring the density or the material property correlated to the density and on the other hand the prior time when the density was determined at the converging portion of the channel.

In order to reduce this distance, which is called the control distance, the property correlated to the density should be measured as early as possible, preferably just after the output of the converging portion and before the point where the binder is hardened.

In executing the invention it is very advantageous to use a heat cureing or dried binder which can be hardened by heating the channel, whereby the heat is transferred through the channel walls and is transmitted to the compressed mineral wool length in the channel. It is still more advantageous, however, to provide heated gases such as combustion gases through holes on opposite sides of the channel walls and through the length of mineral wool in the channel. If a heat curing binder is used, such as phenolic resin, only small amounts of moisture are evaporated, and it is therefore possible to use a reciprocating heater gas. Before introducing the gas into the channel and after the gas leaves the channel an amount of heat corresponding to the heat losses is added to the reciprocating gas. The admixture of heat to the reciprocating gas can be made by heat batteries, preferably electrically heated batteries mounted adjacent the channel. It is possible to combine the heating of the reciprocating gas with a catalytic combustion of impurities expelled from the binder. In such case a continuous supply of oxygen is necessary which can easily be provided by draining some part of the reciprocating gas and adding fresh air. Only some small part of the reciprocating gas needs to be drained, and the equipment may generally work in a closed process.

In operation a moulded object having the same cross-section form as the channel is expelled from the channel following the movement of the piston. After the heating of the moulded object a substantial amount of heat is maintained in the expelled moulded object. The said amount of heat must in one way or another be removed, but it is preferred to make use of said heat in some way. A particularly suitable way is to use the said heat to dry a surface covering which is sprayed into the moulded object after it has been expelled from the channel. The continuous feeding of moulded objects out of the channel also offers very good possibilities for providing any type of surface covering. Consequently a surface covering strip may be applied to the surface of the moulded object at the same time as the moulded object leaves the channel. Also longitudinally extending strips can be applied along the moulded object. Such strips can be applied by being fed through slots in the channel wall before the moulded object is expelled from the channel. In such case the application of strips will be done fully automatically without any supplementary equipment.

When the flocks are compressed in the mould channel they are flattened so that they have the widest extension perpendicularly to the longitudinal axis of the channel. Due to said transversally directed fibre extension the moulded object is weakened so that it can easily be broken, since the intermeshing between different flocks are substantially less than the intermeshing of fibers within the separate flocks. In those cases where breaking brittleness is disadvantageous the above mentioned surface covering may be a good remedy. In some cases it may be sufficient to use a surface covering which does not cover the entire outer surface. In this case narrow strips of some tension stiff foil may be applied in the axial direction of the moulded object. In some cases, however, it is both possible and preferable to introduce some type of reinforcement in connection with the original compression of the mineral wool. For example, wires or reinforcement strips, preferably allowing penetration of air, are fed through axial bores in the piston. Thereby the reinforcement strips or the reinforcement wires are embedded in the length of mineral wool. There are no difficulties in selecting such reinforcement means which do not influence the hardening of the binder. The reinforcement means can also be introduced through slots in the channel walls so as to stick to the outer surface of the length of mineral wool advanced through the channel be means of the binder in the mineral wool. The reinforcement means of course must be introduced in the channel before the position where the binder is hardened.

At the place where the moulded object is expelled from the channel there are good possibilities for providing treatment other than surface covering since the moulded object is kept steadily in the mouth of the channel and is fed by the action of the piston. For instance the moulded object can be slotted, which is necessary when manufacturing pipe jackets which have to be opened in order to place the jacket over the pipe to be insulated. It is hereby also possible to provide such longitudinal cavities which are difficult to provide by a special formation of the channel.

When manufacturing pipe jackets the channel is annular, having a circular cross-section. Both in such cases and in other cases when the finished moulded object have one or more axial bores, one or more cores can be introduced into the channel. In this case the piston must also have a corresponding bore since the cores must be mounted at the rear side of the piston and behind the rear end position thereof. Especially when several cores are provided in the channel it is advantageous if the channel is vertical and the mineral wool is pressed downwards into the channel. Even if no cores are used it is advantageous to arrange the channel vertically since the feeding of the pieces into the channel is in such case simplified. Such mounting of the channel is, however, not necessary, but it is especially preferred in the case where one or more very thin cores are provided in the channel. Still, it may happen that the cores, especially at the point opposite the mounting point tend to bow out from the intended position in the channel. It can therefore be necessary to attach the core also at a point outside the outlet mouth of the channel. The moulded object expelled from the channel which is thereby guided by the core or the cores has to be slotted and bent out to get free from the attachment point of the core.

The continuous manufacture of moulded objects according to the invention, as in any other continuous processes, is especially advantageous in that products of different lengths can be manufactured. Generally, however, the goal is to make a large number of moulded objects having the same length. When executing the invention it is thereby advantageous to cut the moulded objects in connection with the manufacture of the length of mineral wool and also to cut the moulded objects automatically. By the reciprocating movements of the piston or the rotating movements of the feeder screw the moulded object is expelled at the outlet mouth of the channel to an end position which is not necessarily the same as the intended point of cutting the moulded object. Therefore the cutting apparatus should be movable along the expelled moulded object and it can preferably be of the kind which comprises a stop means adapted to be actuated by the outer end of the moulded object. The moulded object is cut at a predetermined distance from the said stop means and thereby the apparatus guarantees that all moulded parts are cut to one and the same length. If the distance between the cutting apparatus and the stop is adjustable the lengths of the cut moulded objects can easily be adjusted.

As previously mentioned it is known when making flocks of mineral wool or after said process to add additional binder. By the method suggested according to the invention this is also possible.

To summarize, the invention relates to a method for manufacture of moulded objects of the above characterized type. The apparatus for carrying out the method comprises:

(a) An apparatus for making flocks of mineral wool which are impregnated with a binder. Such flock making machine can comprise one slowly and one rapidly rotating brush roller, which are provided parallel with each other at a slight distance from each other or without any distance from each other. Between the said brush rollers a stream of mineral wool impregnated by a binder is introduced. Depending on the different speeds of the brush rollers the path of mineral wool is broken up into several small flocks which by the action of the quickly rotating brush rollers are thrown out so as to flow freely in the air;

(b) An apparatus such as a conveyor for continuously transmitting the flocks. The transport apparatus may also be a pneumatic conveyor. It is also possible to use a chain having dog followers which are movable at the bottom of a groove into which the flocked mineral wool is thrown. The conveyor moves the flocked mineral wool to a feeding chamber. Before introducing the flocks into the feeding chamber they may pass a granulating equipment, for instance comprising a horizontal or preferably slightly bevelled perforated drum. At one end of the drum, in case of a bevelled drum the upper end, the flocks are fed, whereupon the flocks roll on the inner surface of the drum and are in time nodulated or granulated. In this connection the non-fibred particles, so called pearls, which are still present in the mineral wool can to a great extend be separated through the perforation of the drum and are collected underneath the drum. From the opposite end of the drum the flocks now transformed to granules are fed into the feeding chamber by a similar conveyor;

(c) One or more mould channels connected to the feeding chamber and the cross-section of which are less than that of the feeding chamber and correspond to the cross-section of the moulded objects which is intended to be manufactured. In many cases it is advantageous that the channels are provided vertically downwards and are connected to the bottom of the feeding chamber;

(d) For each channel there is a compressing means such as a piston which is connected to a double acting hydraulic or pneumatic cylinder so as to perform a reciprocating movement so that at one position the piston is located inside the channel and in the opposite position in the feeding chamber, whereby there is a space between the inlet opening of the channel and the end of the piston turned to said inlet opening. The piston has a cross-section which substantially corresponds to that of the channel. It is, however, advantageous that the cross-section of the piston is less than that of the channel and it is likewise advantageous that the bottom surface of the piston facing the channel be rounded at the edge meeting the piston sides;

(e) An apparatus for directly or indirectly heating the length or lengths of mineral wool advanced in the channel or channels;

(f) A suction fan for feeding pieces of mineral wool into the channel and for drawing air from inside the channel through openings in the channel wall. Preferably the air leaving the fan is introduced into the feeding chamber so as to maintain the pieces in movement. If several channels are connected to the same feeding chamber also the suction fan can be used in common by several channels. If, however, the channels are of different kind and intended for different types of moulded objects, in spite of the fact that they are connected to the same feeding chamber, one suction fan ought to be provided for each channel or one or more fly valves should be provided in the suction pipes so that the introduction of air and pieces suspended in the said air into each respective channel can be controlled to a sufficient extent.

The openings or bores in the channel wall through which air is removed from the channel should be provided adjacent the feeding end of the channel and they should not be provided further down in the channel than the action area of the piston.

It is advantageous if the air removed from the channel by the suction fan or at least some portion thereof is not directly introduced into the feeding chamber but is guided to the apparatus for making flocks or to a granulating apparatus if such apparatus is provided. The circulating air thereby assists in feeding flocks or granules from the apparatus for making flocks and granules respectively to the feeding chamber and from there into the channel or channels. If sufficient amounts of air in this way are guided back to the apparatus for making flocks and granules, respectively, the transportation therebetween and from there may follow completely pneumatically.

Feeders for feeding pieces from the feeding chamber downwards or into the channel can alternatively be made as a reciprocatable feeder or by feeder screws. The said feeding apparatus may cooperate with a means for pneumatically sucking pieces into the channel. Reciprocatable feeders are preferably acutated by pneumatic or hydraulic cylinders. Generally the same working fluid is used as for the compression piston. It is thereby easy to synchronize the apparatus so that the feeders are located in their most extended position at the same moment as the compression piston is in the end position farthest from the channel. The compression means piston is provided with one or several axial bores for receiving one or several cores provided in the channel. Behind the end position of the piston spaced from the channel a fixture for the core or cores is mounted.

For controlling the degree of compression of the mineral wool in the channel, bores may be provided in the channel walls in front of the working area of the piston and provided in the longitudinal direction and evenly distributed around the periphery of the channel. The bores are to the greatest extent covered by tongues provided substantially in the axial direction of the channel and the ends of which adjacent the feeding end of the channel are mounted in the channel wall whereas the opposite ends of the tongue are movable between two extreme positions, one position corresponding to the position of the channel wall and the other position being some point in the channel spaced from the channel wall. The tongues should cover the largest portion of the periphery of the channel. The movable ends of the tongues can be supported from outside by screws or hydraulic cylinders which thereby define the position taken by the tongue in relation to the channel wall since the mineral wool which is present in the channel tends to press the tongues radially outwards from the said second position. In order to provide a flexible control, the screws can be actuated by a servo mechanism which is actuated by a common guide unit like the hydraulic cylinders if the control apparatus for the tongues comprises such cylinders.

The invention shall now be described in more detail with reference to the accompanying drawings. It is however to be understood that the described embodiments illustrated in the drawings only illustrate examples, and that various modifications may be presented within the scope of the appended claims.

In the drawings:

FIG. 1 diagrammatically shows a plant for executing the method according to the invention.

FIG. 5 is a view similar to FIGS. 2 and 3 illustrating another embodiment in which the compressing means is a rotatable screw.

FIG. 6 illustrates the apparatus of FIGS. 2 and 3 but modified to be a twin plant having two apparatus for treating the mineral wool and connected to a common feeding chamber for flocks and/or granules.

Figure 1:
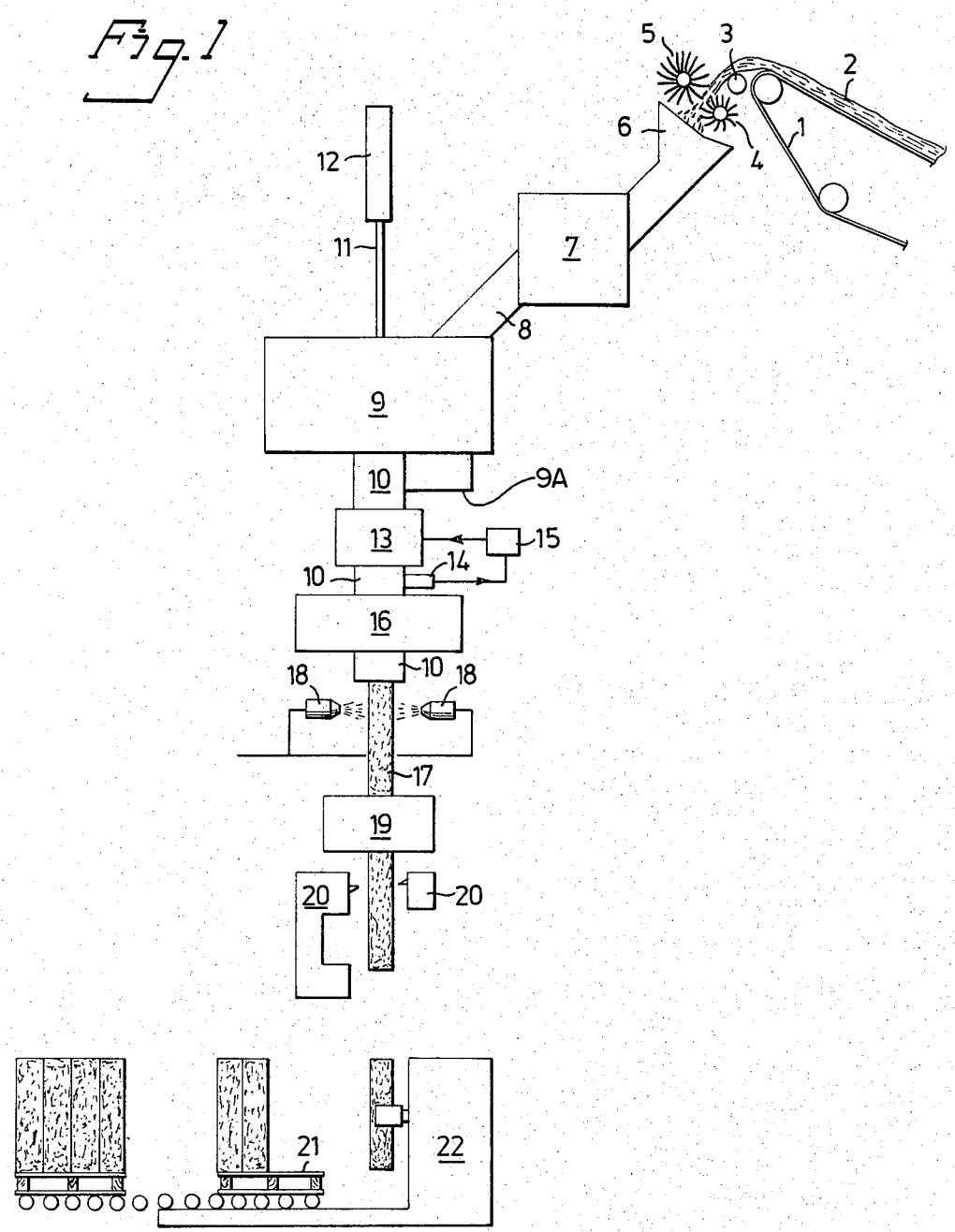

As mentioned above FIG. 1 diagrammatically illustrates how a plant according to the invention can be arranged. On the conveyor 1 a stream of mineral wool is transported, in which binder is not yet distributed. Over the guide roller 3 the mineral wool path is transferred to a brush roller 4 which rotates in a counter clockwise direction with the same or slightly higher peripheral speed than the speed of the conveyor 1. Against the mineral wool thereby transferred to the brush roller 4 acts another brush roller 5 rotating in a clockwise direction. The brush roller 5 rotates with much higher speed than the brush roller 4. The mineral wool stream is thereby broken up into flocks which are thrown down into the funnel 6 which guides the flocks into a granulating mill 7 in which the flocks are modulized or granulated.

The flocks and/or granules, i.e. pieces are moved by the conveyor 8 into the feeding chamber 9, at which the entrance end of the mould channel 10 is connected. The pieces drop down or are fed into the channel 10 and are compressed and are brought further into the channel by a compressing means which in this case is a piston mounted at the bottom end of a connecting means 11 in the form of a piston rod actuated by a power means 12, in the form of a fluid operated cylinder. Associated with feeding chamber 9 is a feeder 9A to assist in feeding pieces into channel 10. Feeder 9A may include reciprocating feeders or an air circulating system.

Underneath the working area of the piston in the mould channel 10 there is an apparatus 13 for controlling the degree of compression of the length of mineral wool pressed downward by the piston. If desired the density is measured at 14 by suitable means, for example as shown herein by determining the permeability by directing air at a constant pressure into the mineral wool and measuring the flow of air. The flow of air which passes into the mineral wool body is proportional to the permeability and is inversely related to the density, and the value thereof may be fed in the form of an electric or pneumatic control signal into a control unit 15 which guides the apparatus 13 for controlling the degree of compression.

The channel 10 further extends through a hardening apparatus 16 in which the length of mineral wool together with the binder distributed therein advanced in the channel is heated so that the binder is hardened.

The mineral wool body 17 which is now form stiff is thereafter expelled from the channel and when leaving the channel a surface treatment agent may be sprayed onto the body 17 by the spray nozzles 18. The surface treatment agent may be dried in a drying apparatus 19 whereupon the continuous body or moulded object 17 is cut by the cutting apparatus 20 and is piled on pallets 21 by means of a piling apparatus 22.

Figure 2:
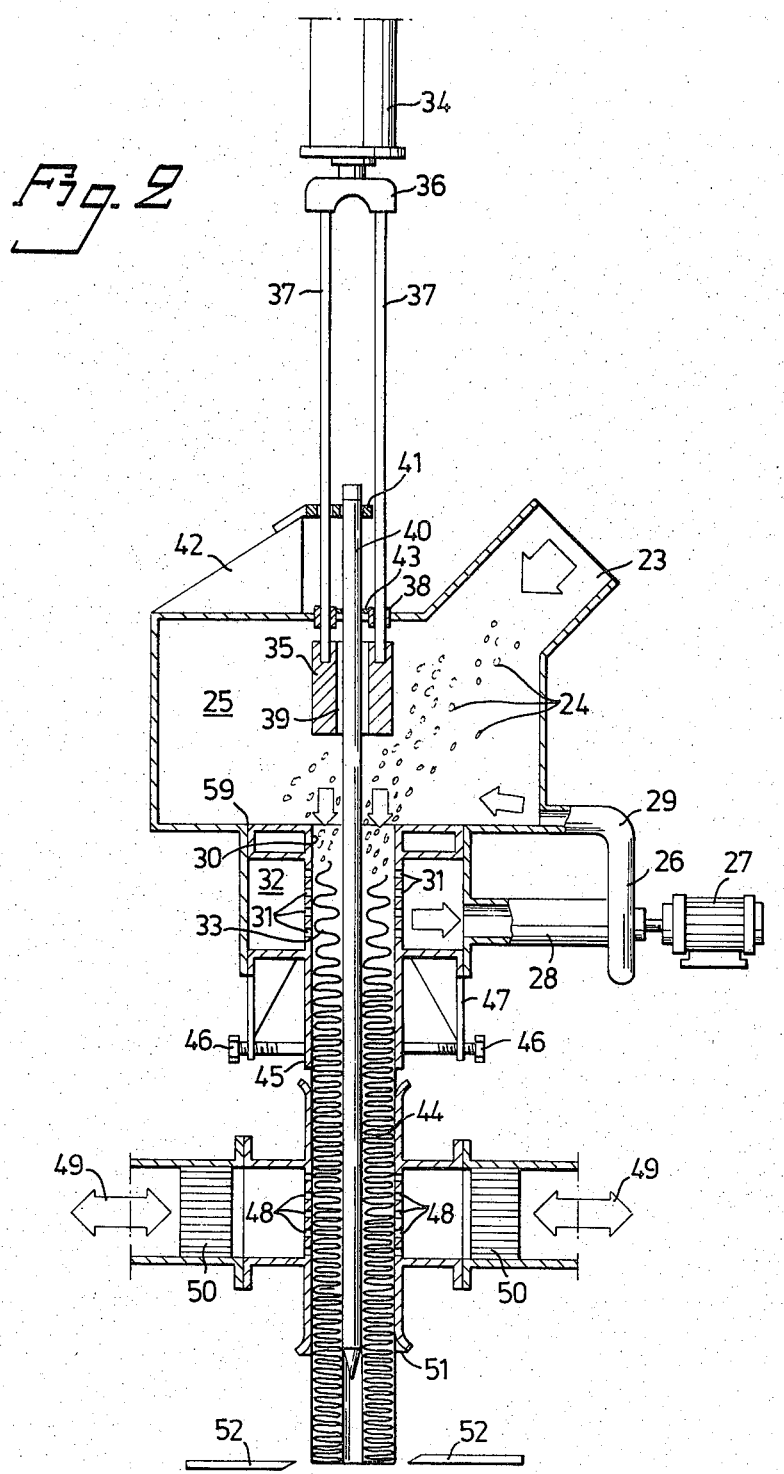
FIG. 2 is an axial cross-section through a plant having certain portions of the features illustrated in FIG. 1 and having a compressing means in the form of a piston illustrated at one end position.

FIG. 2 is an axial cross-section through the central portions of an apparatus having certain of the features of FIG. 1. Through the opening 23 pieces 24 of mineral wool having a binder which is not yet hardened are fed via conveyor (not shown) into the feeding chamber 25 corresponding to feeding chamber 9 of FIG. 1 from a conveyor which is not illustrated in the drawing.

Corresponding to feeder 9A there is provided herein an air flow feeder comprising fan 26 which is driven by a motor 27 which provides a flow of air entering the channel 10, the upper part of which is designated herein as 30, by means of a suction pipe 28 and an exhaust pipe 29. The flow of air is over the bores 31 from the channel 30 out into the surrounding suction chamber 32 and from there over the suction pipe 28 back to the fan 26. The flow of air which is consequently circulated brings pieces 24 from the bottom portion of the feeding chamber 25 into the channel 30 in which they are separated from the flow of air when the air leaves through the bores 31. The pieces are kept in the channel 30 thereby providing a relatively loose collection 33 of mineral wool.

Acutated by power means 1 in the form of the double acting cylinder 34 which is only partly illustrated in FIG. 2 the piston 35 is movable up and down. The cylinder 34 actuates the piston 35 over connecting means 11 which herein comprises the yoke 36 and the piston rods 37. In FIG. 2 the piston 35 is illustrated in its upper position adjacent the upper part of the feeding chamber 25. The piston rods 37 extend through bearings 38 in the upper part of the feeding chamber 25.

This piston 35 has an axial bore 36 through which a core 40 extends. The core 40 is carried by the support 41, which in turn is supported by the bracket 42. The core 40 is sealed against the upper side of the feeding chamber 25 by the bushing 43.

When the piston 35, actuated by the cylinder 34, moves downwardly and into the channel 30, it compresses the loose collection of mineral wool 33 which has been sucked into the channel. The pressure from the piston is transmitted further into the mineral wool and forces the length of mineral wool 44 which is present in the channel a distance forward which is dependent from the amount of mineral wool sucked into the channel between the piston strokes and the compression degree thereof.

The compression degree is controlled by a compression control device which herein comprises several tongues 45 which form the main portion of the periphery of the channel and at the upper part are integral with the channel wall. By means of the screws 46 the lower ends of the tongues can be pressed radially inwards against the length of mineral wool 44 thereby making the channel partially converging. The degree of convergence is defined by the resistance from the channel walls against the advancing of the length of mineral wool. When adjusting the screws 46 they are moved in relation to the brackets 47, which are fixedly mounted in relation to the channel.

After the length of mineral wool has passed the tongues 45 it is pressed through a portion of the channel which comprises the means for hardening the binder. In this case it comprises a portion of the channel which is perforated by bores 48 on opposite sides of the channel. Through the bores and through the mineral wool a reciprocating air flow is passed as indicated by the arrows 49. The movements of the air flow are provided by a bellows or piston apparatus which is not illustrated in the drawing. Before the air enters the channel or leaves the channel it is forced through heat batteries 50 which may contain a catalyst for facilitating possible expulsion of binding agents from the mineral wool.

After the outlet opening 51 a cutting apparatus is provided which in this case is diagrammatically illustrated by two knives 52.

Figure 3:
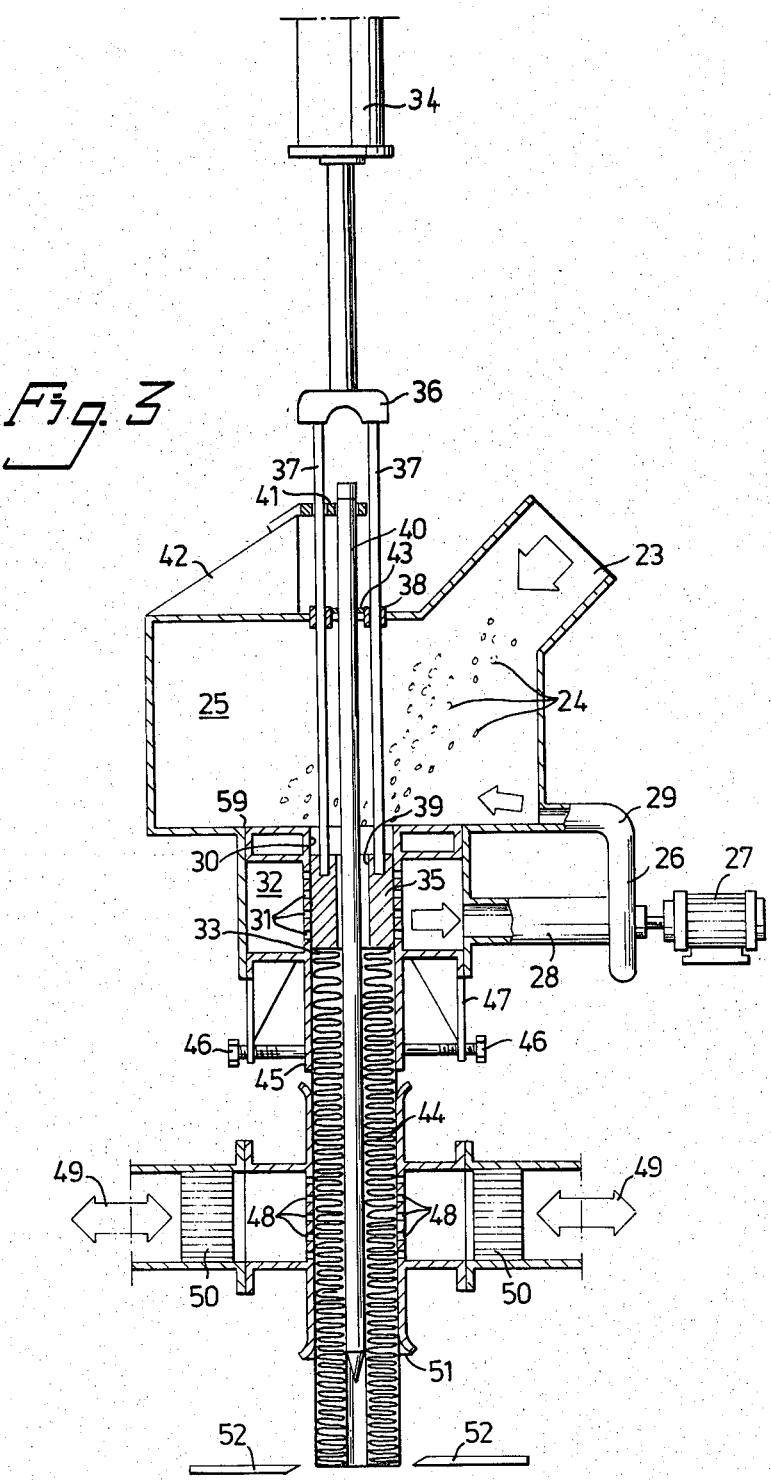
FIG. 3 illustrates the apparatus according to FIG. 2 with the compressing means shown in the opposite end position.

FIG. 3 shows the same apparatus as FIG. 2 but with the difference that the piston 35 is in the latter case illustrated in its lowest position.

Figure 4:
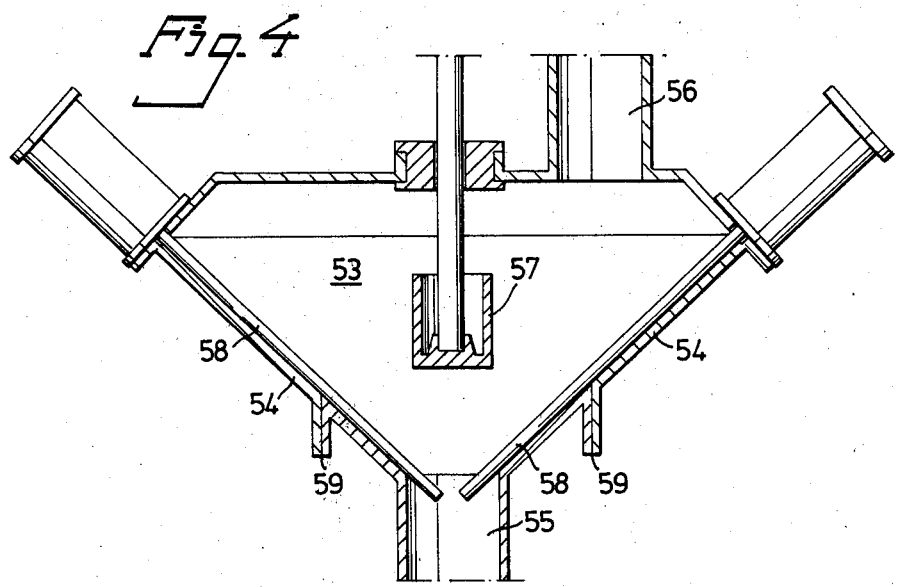
FIG. 4 shows a modified apparatus for feeding flocks and/or granules into the mould channel in the apparatus illustrated in FIGS. 1-3.

FIG. 4 shows another embodiment for feeding mineral wool pieces into the channel, designated in this case as 55. The feeding chamber is shown herein as a chamber 53 formed with a downwards-inwards sloping bottom 54 which slopes down to the inlet mouth of the channel 55. At the upper part of the feeding chamber 53 the supply pipe 56 is provided for pieces. In the chamber also a piston 57 is provided, and the piston is movable down into the channel and can be retracted therefrom into the feeding chamber. Along the bottom 54 a feeder corresponding to the feeder 9A of FIG. 1 is provided in the form of movable pistons 58 which in its extracted state reaches as far as to or even into the channel 55 as illustrated in the drawing.

In FIG. 4, as in FIG. 2, joints 59 are illustrated along which the channel and its connection means can be removed from the remaining part of the apparatus and can be substituted by a corresponding apparatus for manufacture of other moulded objects, for instance moulded objects of other dimensions and/or having another cross-section form.

FIG. 5 illustrates an apparatus which mainly corresponds to the apparatus illustrated in FIGS. 2 and 3 but in which the compressing means is formed as a vertical hollow screw 60 extending some distance down into the channel 30 and which by the screw flanges catch pieces and press them down into the channel. For providing the intended compression the screw 60 can be made conical, and the entrance portion of the channel 30 can be made correspondingly conical. In this case the power means provides rotary motion, via pully 63, belt 64 and pully 65 to the screw 60.

In FIG. 6 is illustrated a twin apparatus in which two channels for compressing and hardening the mineral wool are connected to a common feeding chamber 125. Since the elements other than the enlarged feeding chamber are the same as in FIGS. 2 and 3, the same numerals are used in FIG. 6 to designate such elements.

Figure 7A:
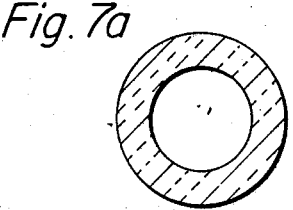
FIGS. 7a-7e illustrate some different types of moulded objects of mineral wool which can be manufactured by the method according to the invention.
Figure 7B:
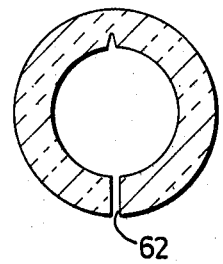

FIGS. 7a to 7e illustrate examples of different cross-section forms for moulded objects which can be manufactured by utilizing the invention. FIG. 7a shows a hollow cylinder which can be used directly as an insert for a sound damper or which can be used as a pipe jacket preferably after having been slit up. The slitting up is made superflous if, as illustrated in FIG. 7b, an adequate axial slot 62 is provided through the cross-section of the moulded object during the manufacture of the said moulded object.

Figure 7C:
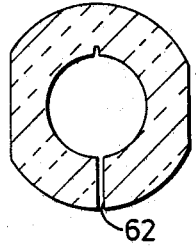

FIG. 7c shows a pipe jacket for a special purpose in which the cross-section is flattened in order to make a tighter mounting of the isolated pipes possible.

Figure 7D:
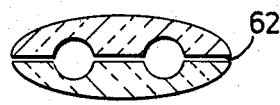

FIG. 7d shows a cross-section form for a moulded mineral wool body useful for insulating two pipes at the same time. The moulded object in this figure comprises two identical halves which can be manufactured separately or by slitting apart a mould body formed as a double unit.

Figure 7E:
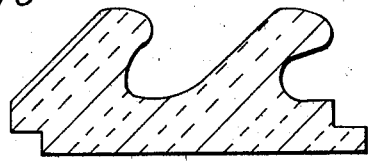

FIG. 7e finally illustrates an example of a completely different type of mould body, viz. an element for covering a wall by so called baffles, which with a suitable form of the baffles gives extremely good sound absorbing properties.

What I claim is:

1. A method of making moulded objects of mineral wool of a desired, substantially constant cross-section along their lengths, comprising the steps of:
    delivering pieces of mineral wool including a non-hardened binder to a feeding chamber and therefrom into a mould channel extending therefrom,
    and, using a mechanical compression means, moving said mineral wool pieces into and through said mould channel and concurrently hardening the binder, such that the mineral wool is concurrently compressed into said desired shape cross-section and hardened as the mineral wool moves through the mould channel.

2. A method according to claim 1, wherein the mould channel extends downwardly from the feeding chamber.

3. A method according to claim 1, including assisting the compression means in feeding the mineral wool pieces from said feeding chamber into the mould channel.

4. A method according to claim 3, said assisting including circulating air into the feeding chamber and into the mould channel.

5. A method according to claim 3, said assisting including using a mechanical device to physically engage the mineral wool pieces and move them toward the mould channel.

6. A method according to claim 1, said step of using a mechanical compression means including exerting a force on the mineral wool pieces while still in the feeding chamber and continuing to exert that force on the mineral wool in a direction along the mould channel after it has entered the mould channel.

7. A method according to any one of claims 1, 2, 3 or 6, including controlling the degree of compression by varying the convergence of a portion of the mould channel.

8. A method according to any one of claims 1, 2, 3 or 6, including measuring a parameter of the mineral wool in the mould channel which is indicative of its density, comparing the result with a predetermined value, and automatically varying the density of the mineral wool in the mould channel in response to such comparison.

9. A method according to claim 8, wherein the mould channel has a portion, the cross-section of which converges in the direction of travel of the mineral wool through the channel, and the step of automatically varying the density includes varying the convergence of said portion of the mould channel.

10. A method according to any one of claims 1, 2, 3 or 6, wherein the binder is a heat curable binder, and said hardening of the binder comprises directing a flow of heated gas through the mineral wool in the mould chamber.

11. A method according to claim 1, including, after the binder hardening step, applying a surface covering to the formed length of mineral wool.

12. A method according to claim 1, including severing the formed mineral wool into cut lengths.

13. A method according to claim 1, including providing a core in the mould channel such that the step of moving its mineral wool into and through the mould channel comprises moving it between the core and the walls of the mould channel at least until after the binder has been hardened.

14. A method according to claim 1, including the step of slitting the formed mineral wool axially along its length.

* * * * *